(12) United States Patent  
Vaccari

(10) Patent No.: US 10,334,825 B2  
(45) Date of Patent: Jul. 2, 2019

(54) HARNESS FOR PETS

(71) Applicant: FERPLAST S.P.A., Castelgomberto (Vicenza) (IT)

(72) Inventor: Carlo Vaccari, Castelgomberto (IT)

(73) Assignee: FERPLAST S.P.A., Castelgomberto (Vicenza) (IT)

( * ) Notice: Subject to any disclaimer, the term of this patent is extended or adjusted under 35 U.S.C. 154(b) by 201 days.

(21) Appl. No.: 15/512,160

(22) PCT Filed: Jul. 28, 2015

(86) PCT No.: PCT/EP2015/067294  
§ 371 (c)(1),  
(2) Date: Mar. 17, 2017

(87) PCT Pub. No.: WO2016/058720  
PCT Pub. Date: Apr. 21, 2016

(65) Prior Publication Data  
US 2017/0290300 A1 Oct. 12, 2017

(30) Foreign Application Priority Data  
Oct. 17, 2014 (IT) .............................. VR2014A0255

(51) Int. Cl.  
*A01K 27/00* (2006.01)
(52) U.S. Cl.  
CPC .................................. *A01K 27/002* (2013.01)
(58) Field of Classification Search  
CPC .............................. A01K 27/00; A01K 27/002  
See application file for complete search history.

(56) References Cited

U.S. PATENT DOCUMENTS

| 6,213,057 | B1 * | 4/2001 | Franco | A01K 27/002 |
| | | | | 119/793 |
| 7,165,511 | B1 * | 1/2007 | Brezinski | A01K 27/002 |
| | | | | 119/792 |
| 8,171,892 | B1 | 5/2012 | Horgan | |
| 9,089,110 | B2 * | 7/2015 | Lai | A01K 27/003 |

(Continued)

FOREIGN PATENT DOCUMENTS

| EP | 1033075 A1 | 9/2000 | |
| EP | 1038434 A1 * | 9/2000 | ........... A01K 27/002 |
| WO | WO 2008/155791 A1 | 12/2008 | |

OTHER PUBLICATIONS

PCT International Search Report and Written Opinion for PCT/EP2015/067294, dated Sep. 24, 2015.

*Primary Examiner* — Kristen C Hayes  
(74) *Attorney, Agent, or Firm* — Orrick, Herrington & Sutcliffe, LLP

(57) ABSTRACT

A harness (10) for pets, typically for dogs (30), comprises a first elongate and shaped front strap (11) designed to be fitted on the chest area, a second elongate and shaped rear strap (12) designed to be fitted on the abdominal area, and an element (13) connecting the above-mentioned first (11) and second (12) straps, designed to be fitted on the animal's back. Each end of the front strap (11) is connected to a corresponding end of the rear strap and to an end of the connecting element (13) at a pin (16, 17) which allows the straps (11, 12) to move relative to each other adapting anatomically to the body of the animal and thus forming a harness suitable for animals of different sizes.

6 Claims, 3 Drawing Sheets

(56) References Cited

U.S. PATENT DOCUMENTS

| | | | |
|---|---|---|---|
| 9,247,716 B2* | 2/2016 | Wilson | A01K 27/002 |
| 9,668,458 B2* | 6/2017 | Sporn | A01K 27/002 |
| 2008/0105216 A1* | 5/2008 | Sporn | A01K 27/002 |
| | | | 119/863 |
| 2013/0213319 A1* | 8/2013 | Hoffman | A01K 27/002 |
| | | | 119/792 |
| 2016/0066544 A1* | 3/2016 | Sporn | A01K 27/002 |
| | | | 119/863 |
| 2017/0265438 A1* | 9/2017 | Sporn | A44B 11/04 |

* cited by examiner

HARNESS FOR PETS

CROSS-REFERENCE TO RELATED APPLICATIONS

The present application is a national phase of PCT/EP2015/067294, filed on Jul. 28, 2015, which claims priority to Italian Patent Application No. VR2014A000255, filed on Oct. 17, 2014, the entire disclosures of which are incorporated herein by reference in their entireties and for all purposes.

TECHNICAL FIELD

This invention relates a harness for pets, typically for dogs, which is comfortable for the animal to wear and allows the owner to perform the application operations faster and more easily.

It is a harness for pets made by combining together three straps, of which two lower and one upper, which can comprise the fixing means for the hook designed to receive the leash.

Unlike the traditional means for retaining pet animals, the harness according to the invention proposes an improved wearability and greater comfort for the animal, due to the presence of a pair of joints which keeps the components connected which leaving them simultaneously free to adapt to the body of the animal, with all the resulting advantages.

Moreover, the upper strap of the harness according to this invention which may comprise the fixing means for the leash is made in such a way as to use quick fastening means which allow the owner to fit the harness on the dog extremely simply and safely, achieving, at the same time, a significant advantage due to the considerable adaptability of the range of harnesses, which is notoriously very large, for the various sizes of dogs.

This invention can be applied in the field of accessories for pets, and in particular in the sector of harnesses for dogs or other similar pets.

BACKGROUND ART

It is known that pets, in particular dogs, are walked outdoors using leashes, the strap of which can be fastened in some cases to the collar applied to the neck of the animal, or in other cases to an accessory known as a harness, which retains the animal not by the neck but by the entire front part of the body.

In the prior art there are various types of harnesses for pets.

A commercially widespread harness consists of a sort of sling formed by two substantially parallel belts, each of which is equipped with an adjusting stop element, held together by two rings and joined to them by two slots. The two substantially parallel belts carry a strap substantially perpendicular to them, with fixed length, with the two ends forming two slots, inside each of which one of the substantially parallel belts slides, in such a way that the perpendicular belt is movable.

The rings are also connected to two further shorter belts, each of which is provided with two small slots adjacent to each other, the first of which stops with clearance a bayonet type closing device, whilst the other, located the end of the conveyor, stops a ring.

In situ, once the adjustment of the length of the two substantially parallel belts has been performed, using the adjusting stop elements with which they are fitted, and the legs of the animal have been inserted in the two large spaces created by the two substantially parallel belts and by the belt perpendicular to them, the two complementary parts of the bayonet type closing device are fitted together above the back of the animal, after having passed the belts around the sides of it, and the spring clip of the leash is inserted in both the rings alongside each other.

A variant of the above-mentioned harness is formed by two belts, each of which forming a slot only at one of its ends, each having an adjustable stop element and held together by two rings made of metal or other material present at their ends. The two belts form the collar, and the two rings are also be joined to two other belts of fixed length forming at the relative four ends of the slots.

A further belt slides through both the slots spaced relative to the two belts forming the collar, one of which is equipped with a ring for hooking the spring clip of the leash; the further belt is also equipped with an adjusting stop element, at the two ends of which there are the two complementary parts of a bayonet type closing device.

In situ, the muzzle of the animal is passed through the collar ring and a leg of the animal is passed through the space formed by the two belts equipped with double slots, and by the belt which passes through the two slots located distant from the collar belts of the two belts; belts are then passed around the back of the animal with the belt equipped with the two parts complementary closing bayonet, and they are fixed by inserting the male part in the female part of the closing device, which will be located, at the end of this operation, above the back of the animal.

A drawback with these harnesses is that their dimensions are fixed, so they can be uncomfortable for the animal and awkward to put on, if too tight.

Moreover, the continuous rubbing due to the movement may cause a loss of hair in the areas on which the belts of the harness rest.

Another drawback of the prior art harnesses is that of being constructionally complicated, as they comprise multiple parts, with belts held together by rings made of metal or other material, resulting in production processes involving various stitching steps to form the slots required to house the complementary closing components, the adjusting stop elements and the rings, thus having a considerable affect on the costs and the duration of their production process, thereby increasing the costs of the finished product.

Another drawbar of prior art harnesses relates to the fact that are relatively difficult to fit to the animals, since they need the person to bend down, lift the dog, lay the harness flat on the ground, pass one or both of the front feet of the animal in the rings formed by the belts of the harness, and then click the closing means after having passed the belts around the back of the dog.

More generally speaking, the drawback which all the prior art harnesses have in common relates to the need to make various harnesses each suitable for dogs of different sizes, which results in increased production costs and difficulties in having them available in store for sale over the counter.

Document EP 1033075 A1 discloses a harness comprising a belly strap for surrounding the animal belly and a front strap for surrounding the front area of the neck, joined to one another by side connecting members, a lower connecting strap joining the belly strap with the front strap, and a symmetrical length-adjustment device comprising two upper straps connecting the side connecting members respectively to a first and a second portion of a releasable clip that can be located as desired along said upper straps.

Document U.S. Pat. No. 8,171,892 B1 discloses a restraint harness for a dog, including a conventional adjustable dog harness or collar and an attached control extension member. The control extension member includes a plurality of straps configured to extend to the hind end of the dog and a motion control cord that is interlaced in and between the conventional adjustable dog harness and the control extension member.

Document US 2008/0105216 A1 discloses a canine control harness having an upper chest strap and a brisket strap, each having first and second ends, where the first ends are interconnected and the second ends are interconnected at respectively laterally spaced apart points over the withers of the dog and including an endless loop strap that slidingly interconnects the spaced apart points of attachment so that tension force applied to the top side of the endless loop will draw the points of attachment together and apply inwardly directed pressure to the body of the dog.

DESCRIPTION OF THE INVENTION

The aim of this invention is to provide a harness for pet animals, typically for dogs but also for other animals, which is made in a constructionally simple manner, using materials and forms which are comfortable for the animal, simple to apply and adaptable with the same model to various sizes of animal, thereby creating a condition which is able eliminate or at least reduce the above-mentioned drawbacks.

The invention provide a harness for pets which is simple to produce and, at the same time, of high quality, thus obtaining a finished product of significant interest for the customer.

This is achieved by means of a harness for pets whose features are described in the main claim.

The dependent claims of the solution according to this invention describe advantageous embodiments of the invention.

The main advantages of this solution concern the fact that, on the one hand, the harness is made in a constructionally simple fashion. using good quality materials and shapes which are comfortable for the animal, and, on the other hand, it is simple to apply as well as adaptable, using the same model, to animals of various sizes.

DESCRIPTION OF THE DRAWINGS

Other features and advantages of the invention will become clear on reading the description given below of one embodiment, provided as a non-limiting example, with the help of the accompanying drawings, in which.

DESCRIPTION OF AN EMBODIMENT OF THE INVENTION

With reference to the accompanying drawings, the numeral 10 denotes in its entirety a harness according to the invention, which substantially consists of three components mutually assembled together.

These components are represented by a pair of straps 11 and 12, suitably shaped, and by a connecting and fixing element 13, typically comprising a belt or tape or cord, this element 13 being provided with retaining means which can be opened to allow the harness to be applied on the body of the dog.

Figure 5:
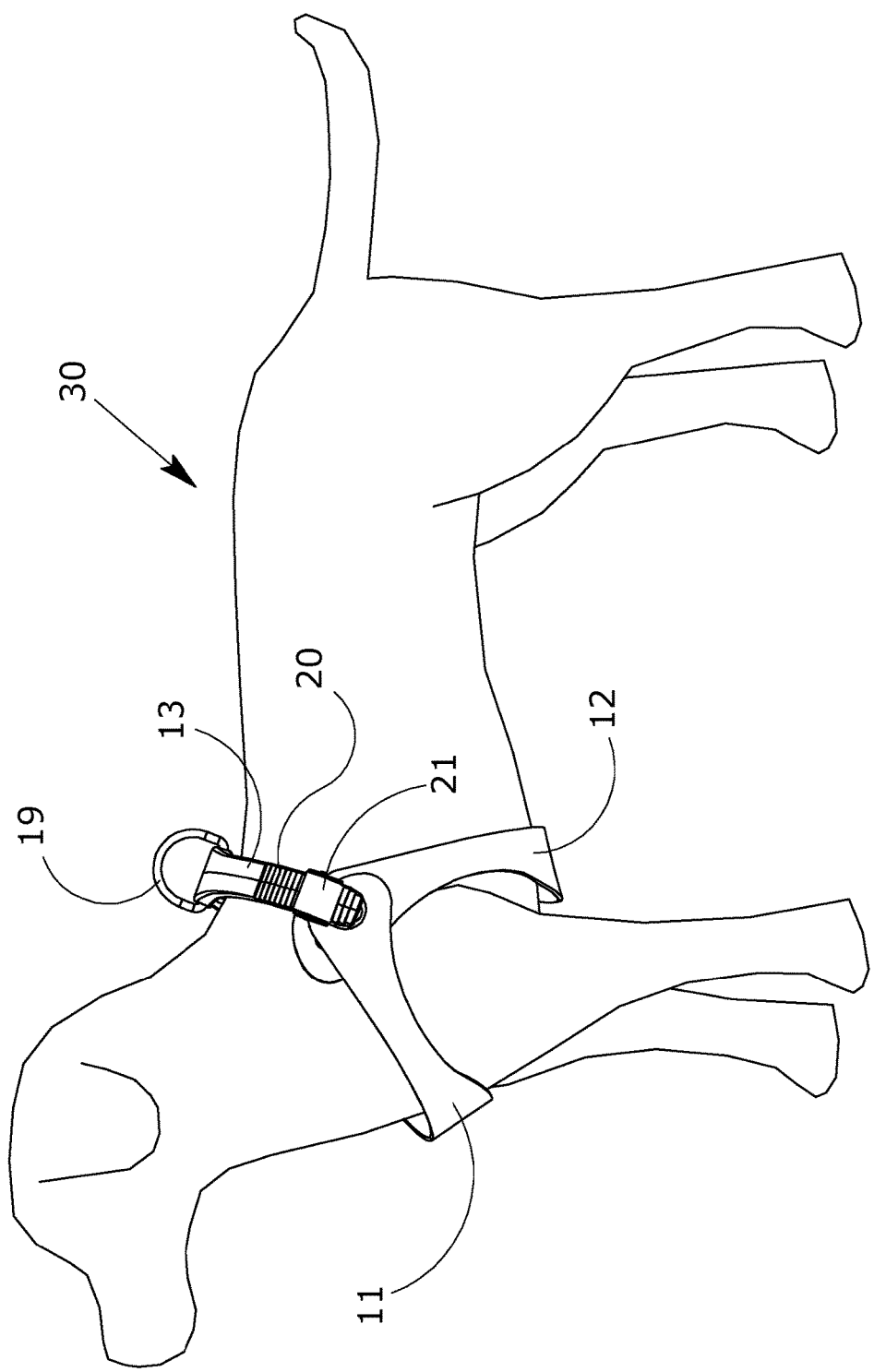
FIG. 5 is a schematic view of the harness according to the above-mentioned drawings, as applied on the body of a pet.

As may be noted in FIG. 5, the strap 11 comprises a front element, designed to operate against the chest of the dog 30, the strap 12 comprises a rear element, designed to operate against the belly of the dog in the area immediately behind the front legs, whilst the fixing element 13 operates at the back of the dog 30.

The straps 11 and 12 have a substantially linear edge 14 opposite an edge 15 shaped with curved lines which allow these components to adapt anatomically to the body of the animal. Moreover, these straps can be either relatively flexible or relatively rigid, depending on the type of harness to be produced.

With reference to a feature of the invention, the two ends of each of the two straps 11 and 12 and the connecting and fixing element 13 are applied respectively to two joints or pins 16, 17, which in the drawings illustrated consist of buttons of the rivet type, which constitute on the one hand retaining elements and on the other joints which make the harness more versatile and universal, adapting to different sizes of animal.

More specifically, according to an embodiment, the connecting and fixing element 13 of the harness comprises a flat and elongate body having a symmetrical and specular shape relative to the centre line, at which a zone of greater thickness 18 is made which in turn comprises a seat through which fastening means are inserted in this case consisting of a ring 19, of dimensions suitable to be fastened to a spring clip belonging to a leash.

In further embodiments of this invention, the fastening means may consist of a pair of rings connected to respective belts fixed on the straps, or may adopt further constructional structures, always with the purpose of allow the fastening of the harness to the spring-clip of a leash.

According to the embodiment illustrated in the drawings, the two ends of the connecting and fixing element 13 of the harness end with a notching 20 to form a type of hook with a double "pawl", associated with the two components 21 and 22 in which the ends are inserted.

The components 21 and 22 comprise fixing elements with a tab pawl in contrast with a spring, which can be opened when the harness is to be released, whilst for the introduction during the fastening step it is sufficient to push until achieving the desired tension.

According to further embodiments of the invention, the fixing elements may consist of technically different means, such as, for example a belt with relative buckle or in any case fixing means which are easily removable as well known to the experts in the sector.

In the embodiments illustrated in the drawings the fixing components 21 and 22 are fixed at the joints or pins 16 and 17 which allow them to be retained together with the other components, with the possibility of angular movement.

Figure 1:
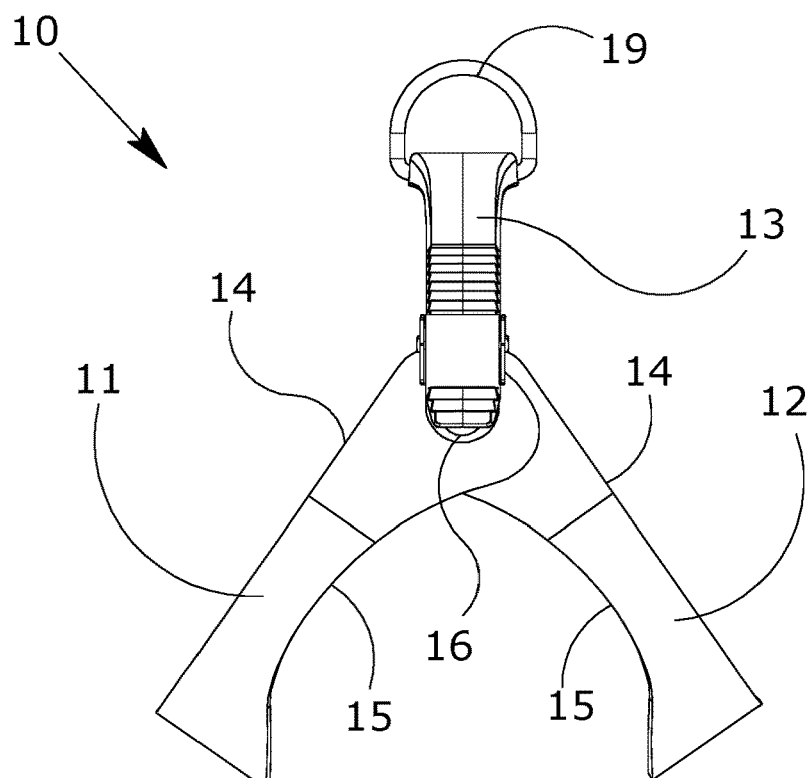
FIG. 1 is a schematic side view of a harness according to this invention.
Figure 2:
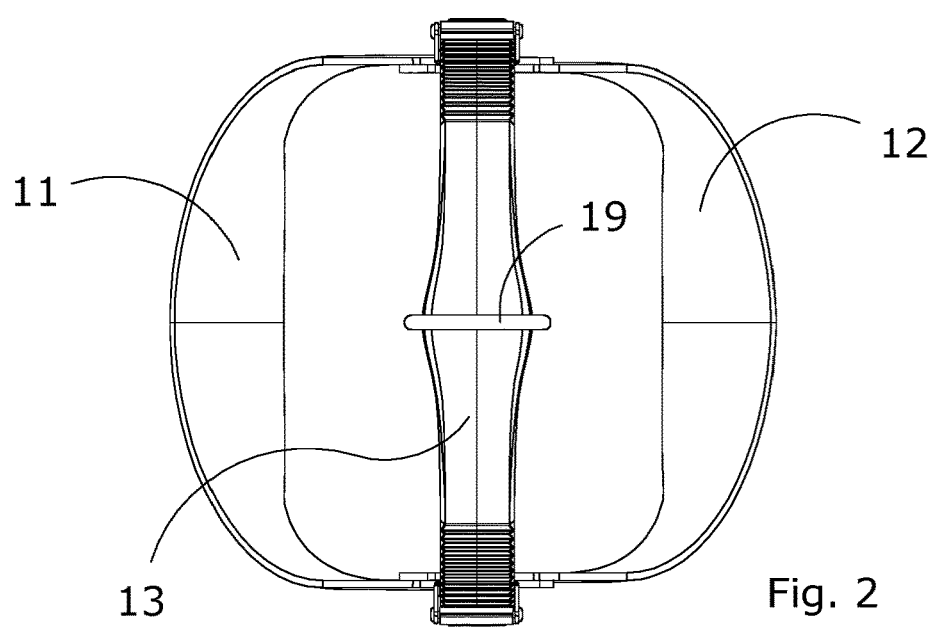
FIG. 2 is a top view of the harness of FIG. 1.
Figure 4:
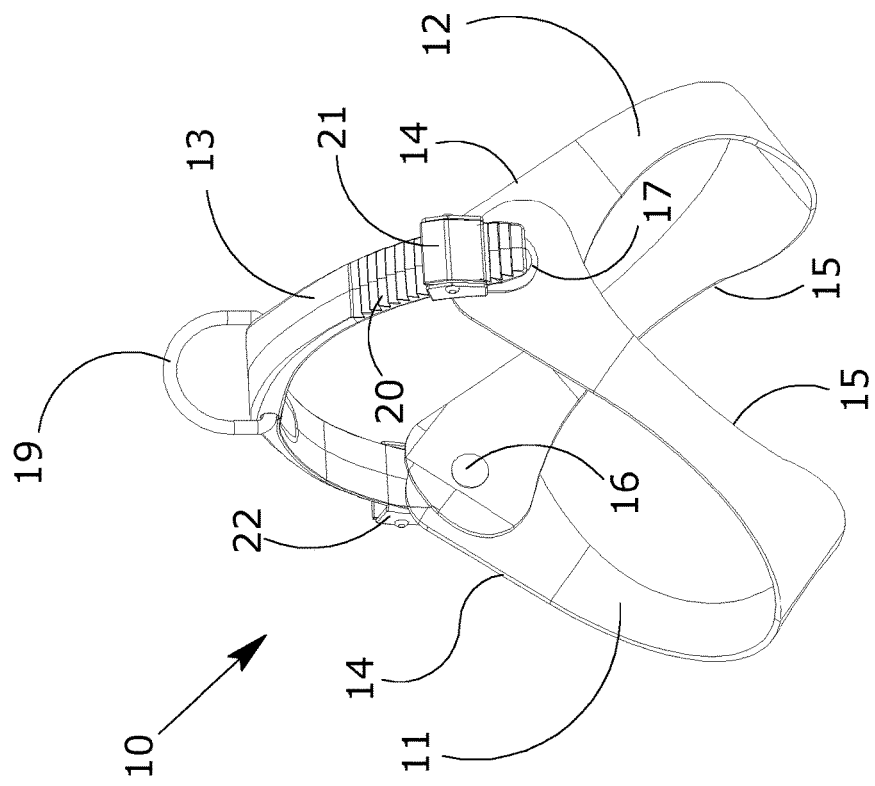
FIGS. 3 and 4 are front and perspective views, respectively, of the harness of FIGS. 1 and 2.
Figure 3:
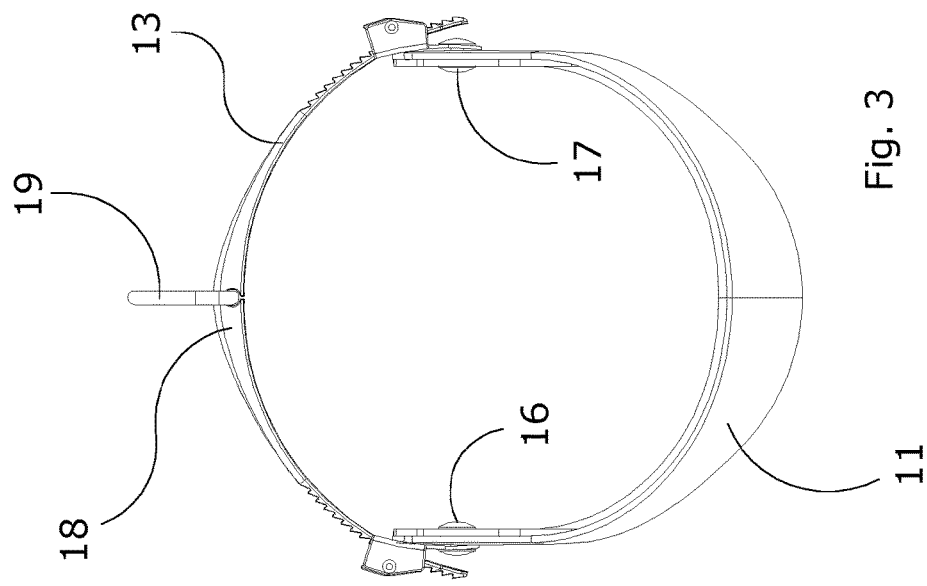

The structure of the resulting harness, according to this embodiment of the invention, is clearly visible in FIG. 4, from which it may be noted that in the harness according to the invention the three components 11, 12 and 13 are joined together by their ends, and are fastened to each other at the two joints or pins 16 and 17. In this context, it should be noted that the straps 11 and 12 are free to move angularly relative to one another, adapting to the anatomy of the dog.

The double pawl closing and double ends of the toothed strap in this case allow for the harness to be fastened with just a few simple operations in order to achieve the result visible in FIG. 5.

From the operational point of view, in order to apply the harness to the dog it is sufficient to open the upper connecting element 13 releasing it from at least one of the two pawls 21 and 22, and then insert the front legs between the two straps 11 and 12, if necessary intervening the first time by adjusting the angular width between the two straps, so that the front strap 11 rests on the chest and the rear strap 12 positions itself in the sternum-abdominal region.

At this point, in order to fix the harness the upper connecting element 13 is inserted between the two pawls 21 and 22 and the tightness is adjusted in such a way that the structure remains constrained without obstructing the movements of the animal, seeking the correct position of the ring 19 to which to attach the spring clip of the leash.

In this regard, it may be noted that the shape of the upper connecting element 13 having the two toothed ends for the double "pawl" closing, associated with the two components 21 and 22, allows a simple and easy adjustment of the harness on the dog, balancing perfectly the barycentre on the basis of the size of the animal and achieving the centring of the ring 19 to which the leash is fastened, exactly at the backbone.

It should be noted that the double pawl fixing system allows the barycentre of the ring 19 to be moved to the right or to the left relative to the back of the animal, depending on the requirements, without moving the alignment of the harness, which always remains perfectly centred on the body. This may prove useful, for example, if the preference is to always hold the animal with the leash kept to the right or to the left of the owner.

It should also be noted how the two straps 11, 12 are connected to each other exclusively at the respective pins 16, 17 and there is no other central connecting element between them as in the prior art solutions (see for example the element 64 illustrated in FIG. 4 of the above-mentioned document EP 1033075 A1). This allows a harness to be made which can be easily adapted to animals of different sizes, unlike the current situation with the prior art solutions, wherein the central element for connecting between the two straps constitutes an obvious limit to the applicability of the harness to animals of different sizes.

It even more clear from the above description that such a leash brings significant advantages with respect to the traditional harness currently on the market.

Firstly, the harness according to this invention offers an improved wearability and a consequent greater comfort for the animal due to the presence of double pawl retaining means associated with the joining means which keep connected the two straps with the possibility of angular adjustment, allowing the maximum freedom of adaptation to the body of the animal.

This same arrangement of components and the possibility of angular adjustment associated with the double pawl-type retaining system also allows for just a few models of harness to cover practically all sizes of dogs, limiting the need for storing models of various sizes, with a practical and economic advantage.

The invention as described above refers to a preferred embodiment. It is nevertheless clear that the invention is susceptible to numerous variations which lie within the scope of its disclosure and within the framework of the technical equivalents as described in the claims below. By way of non-limiting example, there are embodiments wherein the connecting joint between the two straps allows a movement which is not merely rotational, such as in examples described above, but also a translational.

The invention claimed is:

1. A harness for pets, comprising a first front element designed to be fitted on a chest area of a pet, a second rear element designed to be fitted on an abdominal area of the pet, and a third element connecting the first and second elements and being designed to be fitted on a hack of the pet, wherein the first front element and the second rear element respectively comprise a pair of shaped elongated strips, namely a front strip and a rear strip, and wherein each end of the front strip is connected to a corresponding end of the rear strip via a coupling that allows these strips to move with respect to each other, adapting anatomically to a body of the pet and thereby forming a harness suitable for pets of different sizes, wherein the third element is constituted by a connecting tape or cord provided with a fastener that can be opened to allow the harness to be fitted on the body of the pet, and wherein the fastener consists of a ratchet and rack device.

2. The harness of claim 1, wherein each end of each of the two elongated strips and of the connecting tape or cord are respectively connected to a rivet button.

3. The harness of claim 1, further comprising at least one ring for attaching the harness to a clip of a leash.

4. A harness for pets, comprising a first front element designed to be fitted on a chest area of a pet, a second rear element designed to be fitted on an abdominal area of the pet, and a third element connecting the first and second elements and being designed to be fitted on a back of the pet, wherein the first front element and the second rear element respectively comprise a pair of shaped elongated strips, namely a front strip and a rear strip, and wherein each end of the front strip is connected to a corresponding end of the rear strip via a coupling that allows these strips to move with respect to each other, adapting anatomically to a body of the pet and thereby forming a harness suitable for pets of different sizes, wherein the third element is constituted by a connecting tape or cord provided with a fastener that can be opened to allow the harness to be fitted on the body of the pet, and wherein each end of each of the two elongated strips and of the connecting tape or cord are respectively connected to a rivet button.

5. The harness of claim 4, wherein the fastener consists of a ratchet and rack device.

6. The harness of claim 4, further comprising at least one ring for attaching the harness to a clip of a leash.

* * * * *